United States Patent Office 3,179,693
Patented Apr. 20, 1965

3,179,693
CYANOETHYLATION OF INDENE
Hans Dressler, Pitcairn, and John O'Brochta, Pittsburgh, Pa., assignors to Koppers Company, Inc., a corporation of Delaware
No Drawing. Filed May 28, 1962, Ser. No. 197,878
2 Claims. (Cl. 260—465)

This invention relates to the cyanoethylation of crude indene. In one specific aspect, it relates to a method of cyanoethylating the crude indene contained in hydrocarbon distillates from coal tar.

The solvent naphtha fraction obtained by the fractional distillation of coal tar, B.P. 150–220° C. at atmospheric pressure, contains about 30–50 percent by weight indene and, in addition, lesser amounts of indane, benzofuran, benzonitrile, naphthalene, alkylbenzenes, dicyclopentadiene, styrene, and 10–15 additional minor components. The recovery of pure indene from coal tar distillates requires either chromatography, azeotropic distillation or refining with sodium indene, and is therefore quite costly.

We have discovered that, unexpectedly, the indene contained in crude coal tar distillates can be selectively and quantitatively cyanoethylated to provide the useful polycyanoethylated indene. Using the method of our invention, the indene present in a coal tar distillate can be converted to a useful chemical without complicating side reactions, thus obviating the expensive refining techniques referred to hereabove.

The cyanoethylation of indene is not new. Herman A. Bruson, in U.S. 2,280,058, described the cyanoethylation of pure indene in dioxane using a trimethyl benzylammonium hydroxide catalyst. Bruson obtained as a product a pure cyanoethylated indene comprising a minor portion of a dicyanoethyl indene and a major portion of a tricyanoethyl indene. Equivalent cyanoethylation catalysts suggested by Bruson included the oxides, hydroxides, hydrides, amides, and alcoholates of alkali metals.

The use of solvent naphtha as a starting material in Bruson's process was not successful. An alkali metal alcoholate catalyst, sodium methoxide, provided little, if any, reaction (see comparative Example V). The use of the preferred catalyst of Bruson, benzyltrimethylammonium hydroxide, gave a reasonable yield of product, only when coupled with the use of a commercially impractical recovery procedure. After the reaction between acrylonitrile and indene is complete, it is necessary to remove the catalyst by washing or by neutralization. If the catalyst is not removed, there is a marked tendency for the residual catalyst to promote side reactions through the nitrile group, which result in a considerable loss of useful product. The attempted removal of benzyl trimethylammonium hydroxide, which must be removed by washing with water or dilute aqueous acid since it is soluble in organic media (comparative Example IV), resulted in the formation of relatively stable emulsions which separated only after standing for many hours. Successive washings were required to remove substantially all of the residual catalyst and, with each washing, the undesirable emulsion formation resulted.

Surprisingly, we have discovered that the alkali metal tertiary lower alkoxides will selectively catalyze the reaction between acrylonitrile and the indene contained in the crude coal tar distillate without complicating side reactions and without the product recovery problems attendant the method of Bruson.

The method of our invention provides an almost quantatative yield of product. The polycyanoethylated indene thus obtained can be converted by the method described and claimed in the co-pending application of Hans Dressler S.N. 197,843, filed May 28, 1962, to indenedi- and tripropionic acids, which are useful as plasticizers for vinyl resins and intermediates in the preparation of useful polyesters. Alternatively, the polycyanoethylated indene can be catalytically hydrogenated by the method described in the co-pending application of Hans Dressler S.N. 197,878, filed May 28, 1962, to give a mixture of polygamma-aminopropyl indenes having a nematocidal effectiveness considerably greater than sodium N-methyldithiocarbamate a nematocide sold commercially under the trademark Vapam.

It is, therefore, an object of the present inventon to provide a method for the economic utilization of the indene present in crude tar distillates. It is a further object to selectively and quantitatively convert the indene present in crude distillates to the useful polycyanoethylated indene.

In accordance with the invention, a coal tar distillate containing 30–85 percent indene is reacted at an elevated temperature with at least a stoichiometric quantity of acrylonitrile, based on the indene content of the distillate, in the presence of a catalytic amount of an alkali metal tertiary lower alkoxide, whereby the indene contained in the distillate is selectively cyanoethylated. The catalyst is removed from the reaction mixture with an anhydrous organic acid. The desired polycyanoethylated indene is recovered therefrom by conventional methods, preferably by devolatilization.

The starting materials useful in the method of our invention are the crude coal tar distillates. Distillation of coke oven tar yields 0.5–2 percent by weight of a solvent naphtha fraction, B.P. 150–220° C., which contains 30–50 percent indene. Coal gas light oil yields about 10 percent by weight of a similar heavy solvent cut for the indene as a major component. The indene content of the coal tar distillate can be increased up to 70–85 percent by simple distillation. As noted hereabove, the further purification of indene requires either chromatography, azeotropic distillation or other expensive refining processes.

The crude distillate is reacted with at least a stoichiometric quantity of acrylonitrile, based on the indene content of the distillate. A slight excess of acrylonitrile is helpful to drive the reaction to completion. The use of a large excess is obviously wasteful and is, therefore, undesirable from a commercial point of view.

The reaction between indene and acrylonitrile is markedly exothermic. The reaction begins at temperatures as low as about 0° C. and is conveniently controlled at about 50–80° C. Temperatures up to the temperature of the total reflux of the reaction mixture can be used without harmful effect. The reaction is most conveniently run at atmospheric pressure, although higher or lower pressures can be used if desired.

It is essential, for purposes of the invention, to conduct the reaction in the presence of a catalytic amount of an alkali metal tertiary lower alkoxide. The alkali metal lower alkoxides heretofore used in cyanoethylation processes, such as sodium methoxide, provide only an incomplete reaction and a very low yield of desired product. Quaternary ammonium compounds, such as benzyl trimethylammonium hydroxide, provide a reasonable yield of product, but their use incurs prohibitive disadvantages in product recovery because of emulsification during the catalyst removal step. Particularly suitable alkali metal tertiary lower alkoxides include potassium t-butoxide, sodium t-butoxide, potassium t-amyl oxide, and the like. Effective catalytic amounts of the alkali metal tertiary lower alkoxide range between 0.1–2 percent by weight, based on the indene content of the distillate. The use of greater than about 2 percent by weight catalyst is undesirable because it increases the cost of the catalyst removal step and augments the possibility of undesirable side reactions involving the nitrile group.

The use of an inert organic solvent for the reaction is optional. Suitable solvents include aromatic hydrocarbons such as benzene, toluene, xylene, aliphatic hydrocarbons, such as cyclohexane, n-heptane, petroleum ether, and ethers such as 1,2-dimethoxyethane and dioxane. From the commercial point of view, it is desirable to avoid the use of a solvent because of the additional recovery problems encountered.

After the completion of the reaction, which generally occurs in 1–4 hours, the residual catalyst must be removed to prevent side reactions and consequent loss of product. The catalyst is removed by neutralizing it with an equivalent amount of an anhydrous organic acid capable of forming an insoluble salt upon reaction with the basic catalyst. Suitable organic acids include glacial acetic acid, propionic acid, butyric acid, benzoic acid, p-toluene sulfonic acid, oxalic acid, phenylacetic acid, and the like. Preferred acids are the lower paraffinic acids, particularly glacial acetic acid, because of its relatively low cost and commercial availability. It is important that the acid used be anhydrous, because the presence of water in the crude reaction mixture increases the cost of product recovery.

Neutralization of the catalyst results in the formation of an insoluble salt which is separated from the reaction mixture by filtration. After the removal of the catalyst, the polycyanoethylated indene is easily recovered by conventional techniques, such as devolatilization to 100–200° C. at 5–25 mm. of Hg. The product is recovered in substantially quantitative yields (215–225% by weight based on the indene).

Our invention is further illustrated by the following examples:

Example I

To a stirred mixture of 272 grams of Solvent Naphtha fraction of B.P. 175–185° C./atm. (distillation using 20-plate column at 4:1 reflux ratio), containing 67% indene (1.57 m.) by infrared spectral analysis, 225 ml. of benzene, and 4.2 grams of solid potassium t-butoxide there was added 250 grams (4.69 m.) of acrylonitrile during two hours at 50–60° C. The dark mix was stirred for an additional one hour at 55–60° C., and then neutralized with 2.2 ml. of glacial acetic acid, treated with 12 grams of activated charcoal, and filtered. The filtrate was devolatilized to 160° C. (pot)/5 mm. to give 391 grams (215% by weight yield based on indene) of poly(beta-cyanoethyl)indene, an amber semi-solid; found: 14.8% N. The product by analysis was found to be about 75% by weight 1,1,3-tri(beta-cyanoethyl)indene and 25% by weight 1,1-di(beta-cyanoethyl)indene.

Example II

Into a mixture of 300 grams (1.0 mole indene) of a commercial grade Solvent Naphtha containing 39% indene and 2.0 grams (0.018 mole) of potassium t-butoxide there was stirred 150 grams (3.0 moles) of acrylonitrile dropwise during two hours at 50–65° C. After stirring for another hour at 60–80° C., the mix was neutralized with 1.5 ml. of glacial acetic acid, and filtered hot. The cake was slurried with 150 ml. of hot toluene and filtered. The combined filtrates were devolatilized to 180° C. (pot)/2 mm. to give 280.5 grams (240% by weight, indene basis) of residual poly(beta-cyanoethyl)indene.

Example III

Into a mixture of 464 grams (3.0 moles) of 75% indene, 344 ml. of benzene, and 6.0 grams (0.056 mole) of potassium t-butoxide there was stirred 477 grams (9.0 moles) of acrylonitrile during two hours at 50–55° C. After stirring for an additional hour at this temperature, the mix was treated with 3.0 ml. of glacial acetic acid and 20 grams of activated carbon, and filtered. The cake was washed with two 50 ml. portions of benzene. The combined filtrates were devolatilized to 150° C. (pot)/8 mm. to give 799 grams (229% by weight, indene basis) of poly(beta-cyanoethyl)indene; found: 14.4% N.

Similar results are obtained if sodium t-butoxide or sodium t-amyloxide is used as the catalyst.

Example IV

To a stirred mixture of 202 grams of a washed Solvent Naphtha fraction containing 69% indene (1.2 moles), 200 grams of 1,4-dioxane, and 8.0 grams (0.026 mole) of 60% alcoholic benzyltrimethylammonium hydroxide solution there was added dropwise during five hours 200 grams (3.8 moles) of acrylonitrile. The reaction temperature was maintained at 25–30° C. with cooling. After the addition, the mixture was stirred for an additional hour at 25° C., and finally acidified with dilute sulfuric acid. The product was stirred with 500 ml. of ethylene dichloride and 150 ml. of water. An emulsion formed which separated only on standing for many hours. The aqueous layer was discarded. The organic layer was washed successively with three 200 ml. portions of water and 200 ml. of sodium chloride (each time emulsions formed which required prolonged standing for separation). The washed organic layer was then devolatilized to 150° C./20 mm. to give 284 grams of indenepolypropionitrile as a dark, viscous mass.

The above procedure is obviously impractical from the commercial point of view because of the emulsion formation during the catalyst separation step and the repeated washings required to remove salts and acids.

Example V

The procedure of Example IV was substantially repeated using 2.5 grams (0.046 mole) of solid sodium methoxide as the catalyst (instead of benzyltrimethylammonium hydroxide) and 200 ml. of benzene (instead of dioxane) as the solvent. No exotherm was observed. There was, therefore, little, if any, reaction between the indene and the acrylonitrile.

We claim:

1. A method of cyanoethylating indene contained in a crude coal tar distillate boiling at 150–220° C. and containing 30–85% by weight indene comprising contacting said distillate at a temperature of at least 0° C. up to the reflux temperature of the reaction mixture with at least a stoichiometric quantity of acrylonitrile based on the indene content of said distillate in the presence of 0.1–2 percent by weight, based on the indene, of potassium t-butoxide, whereby the indene contained in said distillate is selectively cyanoethylated, neutralizing the residual catalyst in the reaction mixture with an anhydrous organic acid capable of forming an insoluble salt by reaction with said catalyst and recovering polycyanoethylated indene from the reaction mixture.

2. A method of cyanoethylating indene contained in solvent naphtha comprising contacting solvent naphtha at a temperature between 0° C. and the reflux temperature of the mixture with at least a stoichiometric quantity of acrylonitrile based on the indene content of said solvent naphtha in the presence of 0.1–2 percent by weight, based on the indene, of potassium t-butoxide, whereby the indene contained in said solvent naphtha is selectively cyanoethylated, neutralizing the residual catalyst with an acetic acid to form an insoluble salt, removing said salt by filtration, and recovering polycyanoethylated indene from the filtrate by devolatilization.

References Cited by the Examiner

Adams et al.: Organic Reactions, 1949, vol. V, p. 81 (relied on).

Bruson: Journal of American Chemical Society, October 1942, vol. 64, pp. 2457–2461.

CHARLES B. PARKER, Primary Examiner.

LEON ZITVER, Examiner.